Figure 1:
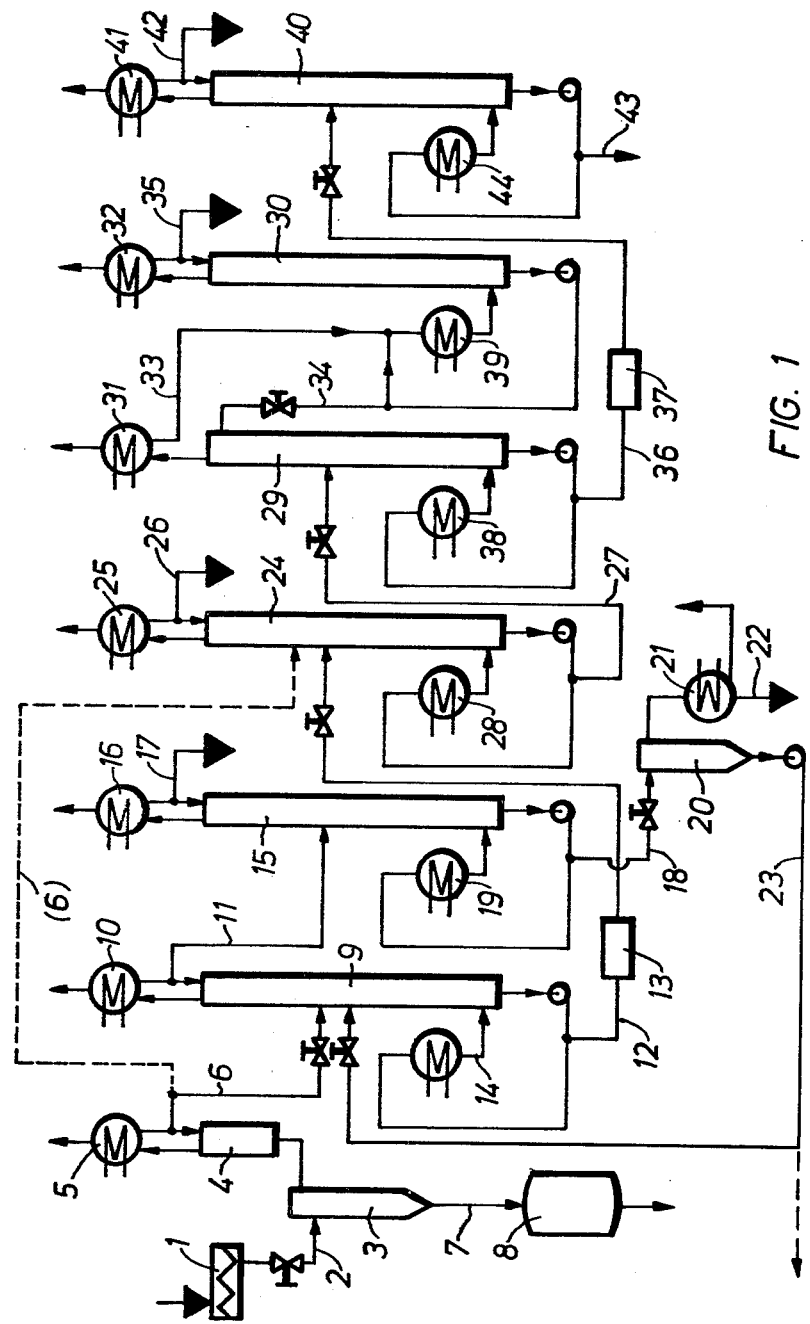

United States Patent [19]

Thelen et al.

[11] 4,162,946

[45] Jul. 31, 1979

[54] PROCESS FOR CONCENTRATING HALOGENOANTHRAQUINONES

[75] Inventors: Bernd Thelen, Leverkusen; Norbert Majer, Schildgen; Reinold Schmitz, Blecher; Hans-Samuel Bien, Burscheid, all of Fed. Rep. of Germany

[73] Assignee: Bayer Aktiengesellschaft, Leverkusen, Fed. Rep. of Germany

[21] Appl. No.: 829,848

[22] Filed: Sep. 1, 1977

Related U.S. Application Data

[63] Continuation of Ser. No. 637,489, Dec. 3, 1975, abandoned.

[30] Foreign Application Priority Data

Dec. 7, 1974 [DE] Fed. Rep. of Germany ....... 2458022
Jul. 17, 1975 [DE] Fed. Rep. of Germany ....... 2531929

[51] Int. Cl.² .......................... B01D 3/10; B01D 3/28; C07C 49/68
[52] U.S. Cl. ........................................ 203/72; 203/73; 203/91; 260/384
[58] Field of Search .................... 260/384; 203/72, 73, 203/80, 91; 23/294

[56] References Cited

U.S. PATENT DOCUMENTS

2,417,027  3/1947  Weinmayr ............................ 260/384

FOREIGN PATENT DOCUMENTS

28166 of 1912 United Kingdom ..................... 260/384
587230  4/1947 United Kingdom .

Primary Examiner—Wilbur L. Bascomb, Jr.
Attorney, Agent, or Firm—Sprung, Felfe, Horn, Lynch & Kramer

[57] ABSTRACT

A process for concentrating at least one of (a) individual halogenoanthraquinones (b) binary mixtures of dihalogenoanthraquinones and (c) binary mixtures of trihalogenoanthraquinones, from a mixture containing at least two halogenoanthraquinones, comprising subjecting said mixture containing at least two halogenoanthraquinones to fractional vacuum distillation in a heated rectification column having an efficiency corresponding to about 20 to 50 theoretical stages with an absolute pressure at the top of about 0.5 to 50 mm Hg and a reflux to take-off ratio of about 5/1 to 50/1. Advantageously, distillation is carried out continuously in a cascade of columns, the products withdrawn from the top of the first column being 2-chloroanthraquinone in the first stage, 1-chloroanthraquinone in the second stage, 1,6- and 1,7-dichloroanthraquinone in the third stage and 1,5- and 1,8-dichloroanthraquinone in the fourth stage, 1,4,5- and 1,4,6-trichloroanthraquinone being obtained in the sump of the 4th stage and being separated therefrom by film evaporation. The mixture of halogenoanthraquinones is advantageously a mixture of chloroanthraquinones such as is obtained by the action of chlorine, chloric acid or a chlorate on various industrial mixtures of nitro- or sulfo-anthraquinones.

20 Claims, 2 Drawing Figures

PROCESS FOR CONCENTRATING HALOGENOANTHRAQUINONES

This is a continuation of application Ser. No. 637,489 filed Dec. 3, 1975 and now abandoned.

The invention relates to a process for concentrating halogenoanthraquinones, preferably chloroanthraquinones, and binary mixtures of di- or tri-halogenoanthraquinones.

As is known, halogenoanthraquinones are industrially important starting materials for the synthesis of valuable dyestuffs (U.S. Pat. No. 2,605,269, German Published DOS No. 2,050,961, British patent specification No. 1,081,890 and German Published DOS No. 1,664,578).

The purity of these starting materials is frequently one of the basic prerequisites for the high level of fastness and the reproducibility of the color shade in accordance with the general requirements in respect of modern dyestuffs.

In practice, halogenoanthraquinones of high purity ($\geq 95\%$) have hitherto been obtained almost exclusively by substituting halogen for the sulpho groups in anthraquinone-sulphonic acids of corresponding purity (so-called "Fischerung"; compare Ullmann's Encyklopadie der technischen Chemie (Ullmann's Encyclopäedia of Industrial Chemistry), 4th edition, volume 7, page 589).

However, this process has the disadvantage that the purification of the technical grade sulphonic acids by fractional crystallization which must be carried out beforehand, is associated with large losses in yield due to the ready solubility of the sulphonic acids and their salts in water (Ullmann's Encyclopädie ter technischen Chemie (Ullmann's Encyclopaedia of Industrial Chemistry, 4th edition, volume 7, pages 587 and 588).

Moreover, the mother liquors obtained in this process impose a severe load on the effluents, from which the amounts of sulphonic acid which have gone into solution had to be removed in an expensive manner, say by evaporation.

A process has now been found for concentrating individual halogenoanthraquinones and/or binary mixtures of di- and/or tri-halogenoanthraquinones from mixtures of halogenoanthraquinones, which is characterized in that mixtures of halogenoanthraquinones are subjected to a fractional vacuum distillation, which may be multi-stage.

It is extremely surprising that it is possible to effect such a good fractional distillation of technical grade mixtures of chloroanthraquinones to be employed according to the invention, even on an industrial scale and especially by the preferred process variants, since complications of very diverse types had to be expected due to the high melting points, the high tendency to sublimation and the narrow range of boiling points. This is emphasized by the fact that even the rectification of pure halogenoanthraquinone isomers has not been described in the literature.

A particular advantage of the new process for the production of pure halogenoanthraquinones or binary mixtures of halogenoanthraquinones is that it is possible to use waste products (for example halogenoanthraquinones produced from mother liquors and effluents from sulphonation of anthraquinone or sump products from anthraquinone nitrations), which were worthless hitherto, as the starting materials and this, in turn, is of particular economic significance with regard to the current shortage of anthraquinone.

According to the process of the invention it is possible to obtain 1- and/or 2-chloroanthraquinone, each in purities of more than 95%, for example in purities of 97 to 99.5%, from mixtures which contain, for example, monochloroanthraquinons. It is possible according to the invention to obtain 1,5- 1,6-, 1,7- and 1,8-dichloroanthraquinone, each in purities of more than 90%, for example in purities of 90 to 95%, from mixtures which contain, for example, one or more dichloroanthraquinones. It is also possible, according to the invention, to obtain from mixtures which contain, for example, several dichloroanthraquinones, binary mixtures which contain either 1,5- and 1,8-dichloroanthraquinone or 1,6- and 1,7-dichloroanthraquinone. It is possible for these binary mixtures of dichloroanthraquinones to be purer than 90%, for example 92 to 95% pure. It is possible, according to the invention, to obtain from mixtures which contain, for example, trichloroanthraquinones, binary mixtures containing 1,4,5- and 1,4,6-trichloroanthraquinone; it is possible for these mixtures to be purer than 80% pure, for example 85 to 95% pure.

Halogenoanthraquinone mixtures in which none of the individual components is present to an extent greater than 50%, for example is present to an extent less than 40%, can be employed in the process according to the invention. Halogenoanthraquinone mixtures in which a halogenoanthraquinone or a binary di- or tri-halogenoanthraquinone mixture is present to the extent of more than 50%, for example to the extent of more than 80%, can also be employed in the process according to the invention. Halogenoanthraquinones of high purity can be produced from such mixtures with relatively little effort. Thus, for example, 1-chloroanthraquinone can be obtained in purities of more than 99%, for example in purities of 99.5 to 99.9%, from a mixture which contains 90 to 95% of 1-chloroanthraquinone. It is also possible, according to the process of the invention, to produce, for example, dichloroanthraquinones or binary mixtures of dichloroanthraquinones, consisting of 1,5- and 1,8-dichloroanthraquinone or of 1,6- and 1,7-dichloroanthraquinone, in high purity.

The halogenoanthraquinone mixtures which are employed in the process according to the invention can also contain, in addition to halogenoanthraquinones, yet further substances, for example anthraquinone, nitroanthraquinones and/or hydroxyanthraquinones.

The halogenoanthraquinone mixtures can have any desired composition.

For example, industrial grade anthraquinone-1-sulphonic acid (about 90 – 95% strength) can be converted, according to A. Fischer, into the corresponding 1-chloroanthraquinone, which contains impurities, by treatment with chlorate and this product can be distilled according to the invention and it is possible, if desired, also to obtain, in addition to the pure main product, the "impurities" (for example 1,6-, 1,7-, 1,5- and 1,8-dichloroanthraquinone) in the pure form.

Impure chloroanthraquinones, such as, for example, 1- or 2-chloroanthraquinone, 1,5-, 1,6-, 1,7-, 1,8-, 2,6- and 2,7-dichloroanthraquinone or 1,4,5- or 1,4,6-trichloroanthraquinone can also be purified by vacuum distillation or vacuum rectification.

The new process is particularly suitable for producing pure halogenoanthraquinones from halogenoanthraquinone mixtures such as are obtained from "Fischering" of monosulphonated and disulphonated products of anthraquinones or from industrial effluents which contain anthraquinonesulphonic acids.

Finally, the halogenoanthraquinone mixtures to be rectified can also be obtained by diluting the entire batch from the anthraquinone sulphonation with water and reacting this solution of anthraquinonesulphonic acids, if appropriate after separating off unreacted anthraquinone, at elevated temperature with hydrochloric acid and chlorates or with chlorine under pressure and isolating the resulting chloroanthraquinones in the customary manner.

Appropriately, the procedure is such that an aqueous solution of chloric acid or salts thereof, preferably sodium chlorate, is added, preferably at 1° to 2° C. below the boiling point of the effluents, to the effluents such as are obtained after sulphonation of the anthraquinone and salting out of the major amount of the desired sulphonic acids with alkali metal halides, or elementary chlorine is passed into the effluent while at the same time irradiating with UV light or under pressure, the chloroanthraquinones, which have precipitated and are insoluble in water, are separated off by filtration, washed with neutral, dried and distilled.

Suitable effluents which can be worked up in this way are, above all, those such as are obtained from α-disulphonation of anthraquinone, which, as is known, is carried out in the presence of mercury, after the two main products (1,5- and 1,8-disulphonic acid) have been separated off.

Mixtures such as are obtained when elementary chlorine or bromine is allowed to act on industrial grade mono- or di-nitration products of anthraquinone (obtained, for example, according to the instructions in German Published DOS No. 2,143,253 corresponding to U.S. Pat. No. 3,818,052, German Published DOS No. 2,306,611 corresponding to Belgian patent specification No. 810,771 and German Published DOS No. 2,256,664 corresponding to Belgian patent specification No. 807,383 are also suitable starting materials for the process according to the invention.

Advantageously, the procedure is such that the melt of a mixture consisting of a nitroanthraquinone mixture and a chloroanthraquinone or bromoanthraquinone, or a mixture of chloroanthraquinone and bromoanthraquinone, is initially introduced, the proportion of the halogenoanthraquinones which serve as the diluent being at least about 10 per cent by weight, and the halogen is allowed to act on this melt at about 180° to 300° C., preferably about 240° to 280° C., and, when the reaction is complete, the reaction mixture is distilled.

It is particularly advantageous to use, as the diluent, those chloroanthraquinones and bromoanthraquinones which are derived from the nitroanthraquinones employed by substituting chlorine or bromine respectively for the nitro group or groups.

The mixing ratio of nitroanthraquinone to halogenoanthraquinone, which has to be set at the start of the reaction, depends on the melting properties of the nitroanthraquinones. Advantageously, it is so selected that a melt which has a viscosity of less than about 10 centipoise at 180° C. and which can be stirred or pumped readily is formed. For the discontinuous mode of operation, the mixtures employed are in general those which contain 10 to 50 per cent by weight of a nitroanthraquinone (remainder: halogenoanthraquinone.)

For continuous running, technical grade or pure chloroanthraquinone is initially introduced in the molten form and the corresponding nitroanthraquinone is added in such an amount that it reacts in the desired manner with the halogen which is passed in.

With the discontinuous process variant, a mixture of a nitroanthraquinone and the corresponding halogenoanthraquinone (for example, 1,8-dinitroanthraquinone and 1,8-dichloroanthraquinone), for which the mixing ratio which is advantageous in order to achieve a melt of low viscosity has been determined in preliminary tests, is heated to the required reaction temperature by supplying heat from outside and then, if appropriate without further external heating, elementary chlorine or bromine is passed in in amounts such that the desired reaction temperature is kept constant by the heat of reaction and no excess halogen escapes from the reaction vessel.

The reaction is complete as soon as no further nitrous gases escape and no further nitroanthraquinones can be detected by thin layer chromatography or gas chromatography.

Naturally, the composition of the mixtures of halogenoanthraquinones, preferably chloroanthraquinones, obtained by one of the processes described above is highly variable. Depending on the nature of the starting material used to produce, for example, chloroanthraquinones, these contain varying amounts of all possible monochloro, dichloro and trichloro isomers.

When the fractional distillation, according to the invention, of the mixtures of halogenoanthraquinones, preferably chloroanthraquinones, which are obtainable by one of the processes mentioned above or by any other desired industrial process, is carried out industrially the procedure, for the discontinuous mode of operation, is such that the melt of, for example, chloroanthraquinones, the temperatures of which are about 20° to 100° C., preferably about 30° to 50° C. and in the case of 1-chloroanthraquinone and about 90° C. above the melting point of the chloroanthraquinones, is subjected to fractional distillation in a rectification column, the efficiency of which corresponds to about 20 to 50 theoretical stages, using a reflux/take-off ratio of about 5/1 to 50/1 and an absolute pressure at the top of the column of about 0.5 to 50 mm Hg.

Because of the high melting points, and the pronounced tendency to sublimation, of the chloroanthraquinones, it is necessary to heat all the parts of the apparatus which come into contact with the product.

Thus, for example, the rectification column must be provided with external jacket heating, which is preferably adiabatic. In order to avoid sump temperatures which are too high and which lead to the formation of undesired cracked products, it is advisable to employ high vacuum columns with a low pressure drop and to equip these with woven metal packings (Ullmann Encyklopädie der technischen Chemie (Ullmann's Encyclopaedia of Industrial Chemistry), 4th edition, volume 2, page 533) or metal packings (Ullmann, 4th edition, volume 2, page 528) and to supply energy at the sump of the column via film evaporators, preferably falling film evaporators.

Appropriately, the technical grade chloroanthraquinones or mixtures which are subjected to rectification are those which, during their production, have been washed very largely free from acid and free from salt and have been freed, by a preliminary distillation with a short residence time, for example by means of a thin layer evaporator, from inpurities which cannot be distilled and form readily volatile impurities which cannot be condensed.

Purification of the technical grade mixtures of chloroanthraquinones by distillation can be carried out particularly advantageously in an installation which operates continuously.

This process variant is characterized in that mixtures of chloroanthraquinones, which as far as possible are acid-free and which contain 1-chloro-, 2-chloro-, 1,5-dichloro-, 1,6-dichloro-, 1,7-dichloro-, 1,8-dichloro-, 2,6-dichloro-, 2,7-dichloro- and in some cases, 1,4,5-trichloro- and 1,4,6-trichloro-anthraquinone are melted in a suitable manner, for example in a melting screw, the melt is freed from constitutuents which cannot be distilled and/or which are readily volatile in an evaporator unit which has a short residence time and low pressure drop, for example in a thin layer evaporator or falling film evaporator, the melt purified in this way is fed continuously to the central section of an adiabatically heated high vacuum rectification column with 20–50 theoretical stages, where it is rectified in such a way that 2-chloro-anthraquinone with a minimum purity of about 94% is withdrawn at the top of the column under a vacuum of 5 to 25 mm Hg and at a reflux ratio of 5/1 to 50/1 and the sump product, which is virtually free from 2-chloroanthraquinone, is fed, also continuously, to the central section of a second rectification column, from the top of which 1-chloroanthraquinone which is at least about 94% pure is withdrawn, while the sump product is transferred into the central section of a third column, from the top of which a binary mixture, which is at least about 94% pure, of 1,6- and 1,7-dichloroanthraquinone is withdrawn, while the sump product is passed into the central section of a fourth column, from the top of which a binary mixture, which is at least about 94% pure, of 1,5- and 1,8-dichloroanthraquinone is withdrawn, 1,4,5-trichloroanthraquinone being isolated from the sump product if desired, for example by feeding it to a thin layer evaporator.

When chloroanthraquinones of a different composition are used it is, of course, possible to dispense with one or two of the columns described above.

It is advisable to subject the particular sump products to an intermediate purification, for example by means of a filter or a thin layer evaporator, in order to remove cracked products, before they are fractionated in the next column.

Naturally, the degree of purity of the fractions obtained by continuous or discontinuous distillation depends on the purity of the starting materials and the demands which are made of the halogenoanthraquinones for further processing to dyestuffs.

For example, a 1-chloroanthraquinone obtained in a degree of purity of 90–95% from technical grade anthraquinone-1-sulphonic acid by "Fischering" can be converted into a highly pure product which contains at least 99% of 1-chloroanthraquinone.

Analogously, 90–95% pure 2-chloroanthraquinone, 1,5-dichloroanthraquinone or 1,8-dichloroanthraquinone can be converted into pure, 99% strength chloroanthraquinones.

On the other hand, when mixtures of chloroanthraquinones obtained from the effluents mentioned above are used it is technically reasonable to aim for a degree of purity of "only" 95%.

Preferably, the products which follow can be obtained according to the new process: 1-chloroanthraquinone, 2-chloroanthraquinone, 1,5- and 1,8-dichloroanthraquinone (as a binary mixture), 1,6- and 1,7-dichloroanthraquinone (as a binary mixture) and 1,4,5-trichloroanthraquinone.

It is possible with a tolerable technical effort, by means of a further vacuum rectification, to concentrate the components of the resulting binary mixtures, for example of the mixture of 1,5- and 1,8-dichloroanthraquinone, to 70–92% and, if appropriate, to concentrate these components even further by other methods, for example by fractional crystallization.

Figure 2:
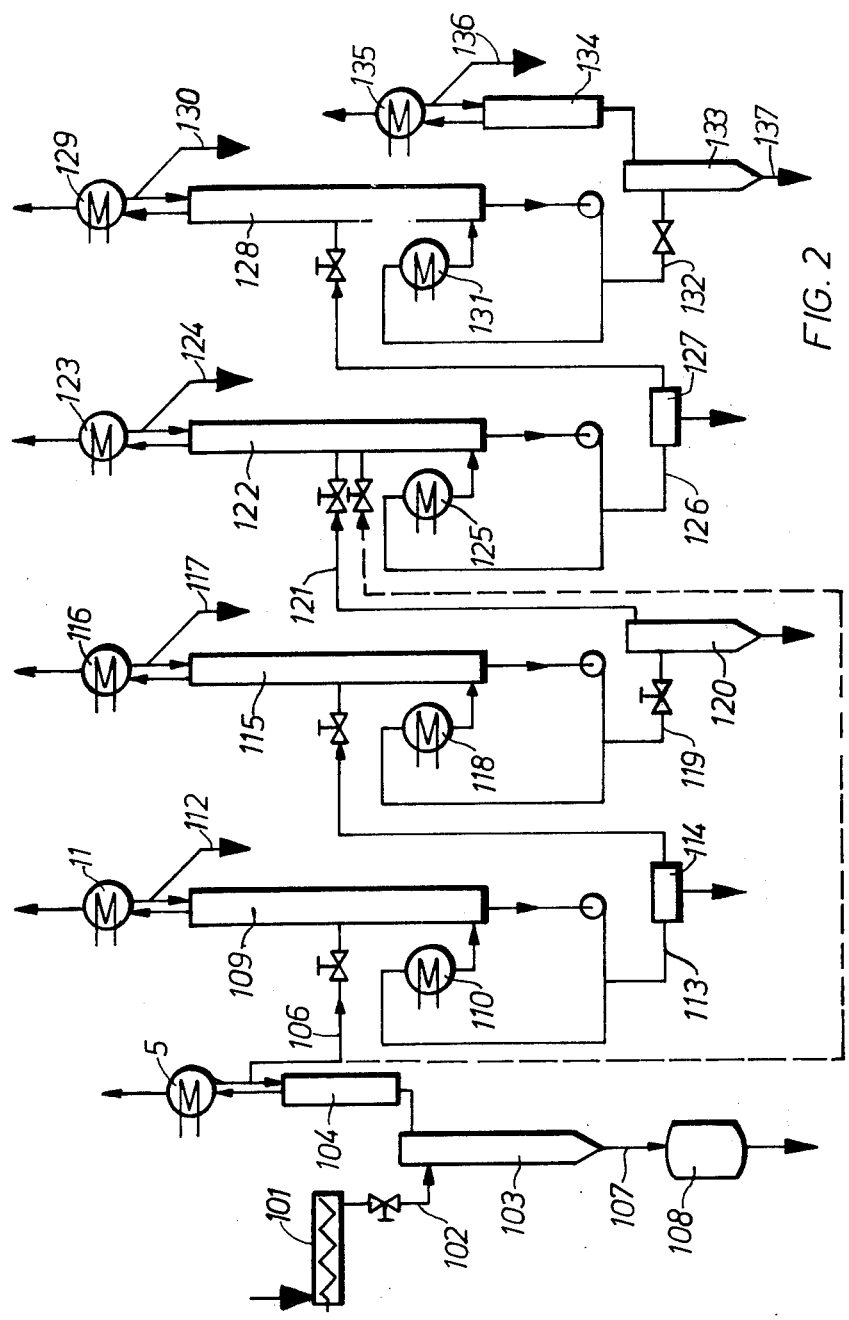

The new process is explained in conjunction with the accompanying drawings, described in detail in the illustrative examples hereinbelow, in which drawings FIG. 1 is a flow sheet of one apparatus for carrying out the process, and FIG. 2 is a flow sheet of another apparatus for carrying out the process.

EXAMPLE 1

(a) According to the instruction in "Ullmann's Encyklopädie der technischen Chemie" (Ullmann's Encycloaedia of Industrial Chemistry), 4th edition, volume 7, page 587, 2,100 kg of oleum (20% strength) are reacted with 15 kg of mercury sulphate and 2,100 kg of anthraquinone for 3 hours at 120° C. The reaction mixture is diluted with 7,000 l of water and filtered and the material on the filter is washed until neutral with 2,000 l of water. Using 1,800 l of concentrated potassiumchloride solution, anthraquinone-1-sulphonic acid precipitates from the filtrate as the potassium salt and this is filtered off. The resulting mother liquor is collected and worked up according to Example 1c.

(b) 960 kg of oleum (5% strength) and 8 kg of mercury are added to 800 kg of anthraquinone and the mixture is reacted with 900 kg of oleum (65 % strength) at 120°–125° C. according to BIOS Final Report No. 1484, page 10, as well as "Ullmann's", supra, page 588.

After diluting with sulphuric acid, the 1,5-disulphonic acid which has precipitated is first filtered off. The 1,8-disulphonic acid is salted out of the filtrate with the aid of potassium chloride. The mother liquors obtained after separating off the potassium salt of this acid are collected and worked up according to Example 1c.

(c) 80 l of the mother liquors obtained according to Example 1a and 40 l of the mother liquors obtained according to Example 1b are combined in a 250 l enamel kettle and heated to 100° C. 12 l of a 10% strength aqueous sodium chlorate solution are fed in at a uniform rate at this temperature in the course of 4 hours, while stirring at 30 – 40 revolutions per minute with an anchor stitter. The mixture is stirred for a further 2 hours at 100° C. and filtered at 80° C. through a filter press, the material on the filter is washed with hot water until the filtrate gives a neutral reaction and the filter cake is dried.

1,800 g of a chloroanthraquinone mixture of the following composition: 22% of 2-chloroanthraquinone, 22% of 1-chloroanthraquinone, 34% of 1,6- and 1,7-dichloroanthraquinone, 16% of 1,5- and 1,8-dichloroanthraquinone and 6% of 1,4,5-trichloroanthraquinone, are obtained.

(d) 1,500 g of this mixture are initially introduced into an electrically heated flask, which is of particularly shallow design, of a distillation column which operates discountinuously. The column consists of 2 sections (nominal width 30 mm; packing height: 2 m; packing: 4×4 mm wire mesh rings) and is provided with an electric adiabatic jacket heater in order to compensate for heat losses.

Above the column there is a condenser heated with heat transfer oil (temperature: about 20° C. below the boiling point of the top product). Separation of the distillate into reflux and take-off is effected via electronically controlled reflux dividers. The top product is collected in heated distillate receivers and removed from the installation in fractions.

All the parts of the apparatus which come into contact with the product are provided with heating jackets through which flows heat transfer oil at a thermostatically controlled temperature.

At a sump temperature of 280° C. (start) to 320° C. (end), an absolute pressure at the top of 10 mm Hg and a reflux/take-off ratio of 20/1, the following fractions are withdrawn:

1st main fraction: at a top temperature of 235° C.=220 g of 97% pure 2-chloroanthraquinone, 1st intermediate fraction: 234 g comprising 44% of 2-chloro-anthraquinone and 56% of 1-chloroanthraquinone, 2nd main fraction at 245° C.=130 g of 95% pure 1-chloroanthraquinone, 2nd intermediate fraction: 97 g comprising 52% pure 1-chloroanthraquinone and 48% of 1,6- and 1,7-dichloroanthraquinone, 3rd main fraction at 263° C.=241 g of a 92% pure mixture of 1,6- and 1,7-dichloroanthraquinone, 3rd intermediate fraction, 380 g comprising 56% of 1,6- and 1,7-dichloroanthraquinone and 44% of 1,5- and 1,8-dichloroanthraquinone, 4th main fraction at 269° C.=45 g of a 92% pure mixtureof 1,5- and 1,8-dichloroanthraquinone and residue: 153 g.

The intermediate fractions obtained can be separated in a second distillation step under similar conditions.

EXAMPLE 2 (see FIG. 1)

(a) 100 l of oleum (65% of $SO_3$) are initially introduced into a 250 l enamel kettle. 2 kg of mercury sulphate are introduced and the mixture is stirred for 5 hours at room temperature, the mercury sulphate dissolving. 240 kg of anthraquinone are then introduced in the course of 2 hours, the temperature rising to 40° C. The mixture is heated to 130° C. in the course of 30 minutes and is kept at this temperature for 2 hours. 200 kg of the melt are dissolved in 3,600 l of water and unreacted anthraquinone (6.8 kg) is filtered off. 160 l of hydrochloric acid (30% strength) and 300 l of sulphuric acid (96% strength) are added to the filtrate, in a 6 m³ enamel kettle, the mixture is heated to 100° C. and 800 l of sodium chlorate solution (10% strength) are allowed to flow in at this temperature in the course of 2 hours. The mixture is kept at 100° C. for a further 2 hours and filtered through a filter press at 80° C., the material on the filter is washed with hot water until the filtrate gives a neutral reaction and the filter cake is dried. 120 kg of a chloroanthraquinone mixture of the following composition are obtained: about 0.1% by weight of anthraquinone, about 3.0% by weight of 2-chloroanthraquinone, about 56.0% by weight of 1-chloroanthraquinone, about 1.1% by weight of 2,7- and 2,6-dichloroanthraquinone, about 12.8% by weight of 1,6- and 1,7-dichloroanthraquinone, about 11.9% by weight of 1,8-dichloroanthraquinone, about 12.7% by weight of 1,5-dichloroanthraquinone and about 2.3% by weight of 1,4,5- and 1,4,6-trichloroanthraquinone.

(b) 105 kg/hour of this chloroanthraquinone mixture are melted in a melting screw (1) at 260° C. and fed continuously via line (2) into a thin layer evaporator (3), which is heated with heat transfer oil at 340° C. The vapors produced in the thin layer evaporator rise into an adiabatically heated concentrating column (4) with 5 theoretical stages and are condensed in condenser (5) (boiling point at 20 mm Hg, about 280° C.). At a reflux to take-off ratio (R/T) = 0.2/1, about 98 kg/hour of top product are withdrawn as the distillate via line (6). Distillate receivers and the condenser are heated with heat transfer oil at 200° C. About 7 kg/hour of a viscous residue, consisting of products which cannot be distilled, cracked products and higher-boiling impurities, flow from the sump of the thin layer evaporator via line (7) into the receiver (8), heated to 270° C., for the sump product. The product which has been pre-purified in the preliminary stage in order to improve the heat stability passes via line (6) into a rectification column (9), which has 30 theoretical stages and in which monochloroanthraquinones are separated from dichloroanthraquinones and trichloroanthraquinones. Approximately 98% pure monochloroanthraquinone, contaminated with anthraquinone and dichloroanthraquinone, as the top product of this column at a top pressure of 20 mm Hg and a boiling point of 255° C., is condensed in condenser (10) and, at a reflux ratio (R/T = 15) is fed via line (11) to the following column (15). The condenser (10) and the distillate take-off (11) are heated with heat transfer oil at 200° C. At a pressure of 35 mm Hg and a boiling point of about 305° C., dichloroanthraquinone/trichloroanthraquinone which is virtually free from monochloroanthraquinone is withdrawn as the sump product from column (9) and fed via line (12) into the rectification column (24). Cracked products which form during the process are removed from the product by means of filter (13). The evaporator (14) is heated with heat transfer oil at 340° C.

In column (15) the monochloroanthraquinone mixture, which flows in via line (11), is separated into 2-chloroanthraquinone and 1-chloroanthraquinone. The adiabatically heated column has an efficiency of 48 theoretical plates. 2.8 kg/hour of approximately 97% pure 2-chloroanthraquinone, contaminated with about 2% of anthraquinone and about 1% of 1-chloroanthraquinone, are obtained as the top product and withdrawn via line (17). Column (15) is operated at a top pressure of 20 mm Hg and a boiling point of 252° C. The reflux ratio is R/T = 100/1. Condenser (16) and the distillate take-off (17) are heated to 220° C. The 1-chloroanthraquinone mixture obtained in the sump is withdrawn from the column, at 45 mm Hg and a boiling point of 290° C., via line (18). The evaporator (19) is heated with heat transfer oil at 340° C. In order to obtain about 55 kg/hour of 99% pure 1-chloroanthraquinone, contaminated with 2-chloroanthraquinone as well as 2,7- and 2,6-dichloroanthraquinone, the sump product is fed via line (18) into thin layer evaporator (20). The product to be obtained is distilled over at 20 mm Hg and 264° C., condensed at 190° C. in condenser (21) and withdrawn from the installation via heated line (22). Higher-boiling impurities and cracked products are taken off via the sump take-off (23) and partly are withdrawn and partly are recycled into column (9). The thin layer evaporator is heated with heat transfer oil at 340° C. Separation of the 2,7-, 2,6-, 1,6- and 1,7-dichloroanthraquinone isomers from the mixture of 1,5-dichloranthraquinone, 1,8-dichloroanthraquinone and trichloroanthraquinone is effected in column (24). The column has 48 theoretical stages. At a top pressure of 15 mm Hg and a boiling point of 270° C., and about 12 kg/hour of 88% pure 1,6- and 1,7-dichloroanthraquinone isomers, contaminated with about 7% of 2,7- and 2,6-dichloroanthraquinone, 2% of 1-chloroanthraquinone and 3% of 1,8- and 1,5-dichloroanthraquinone, are withdrawn from the installation via line (26). The condenser and the distillate take-off are heated to 230° C. The reflux ratio is R/T = 30/1. A mixture of 1,8-dichloroanthraquinone and 1,5-dichloroanthraquinone/trichloroanthraquinone, which is largely free from 1,6- and 1,7-dichloroanthraquinone, is withdrawn from the sump of the column via line (27). The boiling point in the sump of the column is about 310° C. at 40 mm Hg. The evaporator is heated to 340° C. The sump product from column (24) passes via line (27) into the first column (29) of a column combination of two columns (29) and (30) arranged in series. Separation of the 1,5- and 1,8-dichloroanthraquinone isomers is effected in these two columns. Both columns operate at a top pressure of 20 mm Hg and a top temperature of about 288° C. The condensers (31) and (32) and also the distillate lines (33) and (35) are heated to 220° C. About 11 kg/hour of 91% pure 1,8-dichloroanthraquinone, contaminated with about 8% of 1,5-dichloroanthraquinone and about 1% of 1,6- and 1,7-dichloroanthraquinone, are obtained, at a reflux ratio R/T = 40, via line (35). The distillate from column (29) is fed via line (33) into the sump of column (30). The reflux for column (29) is provided by means of the sump product from column (30) via line (34). The two columns (29) and (30) have 32 theoretical stages. The sump temperatures are about 310° C. at 35 mm Hg. The evaporators (38) and (39) are heated with heat transfer oil at 340° C. A mixture of 1,5-dichloroanthraquinone and trichloroanthraquinone, contaminated with about 8% of 1,8-dichloroanthraquinone, is fed via line (36) into column (40). Cracked products which form during the process are removed from the product by means of filter (37). About 10 kg/hour of 90% pure 1,5-dichloranthraquinone, contaminated with about 9% of 1,8-dichloroanthraquinone and 1% of trichloroanthraquinone, are obtained as the top product by means of column (40), which has 28 theoretical plates, and are removed via line (42). At a top pressure of 15 mm Hg, a boiling point of 283° C. is set up. The reflux ratio is R/T = 5/1. Condenser (41) and the distillate take-off (42) are heated to 260° C. The sump essentially trichloroanthraquinone with up to 20% of dichloroanthraquinone and is withdrawn via line (43). The sump temperature is about 310° C. at a pressure of 30 mm Hg. The evaporator (44) is heated with heat transfer oil at 340° C. The entire rectification unit consists essentially of 6 columns, which have adiabatically heated outer jackets. All the parts of the installation which come into contact with the product are kept at temperatures above the melting points of the products.

EXAMPLE 3

1,400 g of a 93% pure 1-chloroanthraquinone, produced from anthraquinone-1-sulphonic acid by exchanging the sulpho group by chlorine according to Fischer (Ullmann's Encyklopäedie der technischen Chemie (Ullmann's Encyclopaedia of Industrial Chemistry), 4th Edition, Volume 7, Example 1, page 589 (1973)) and contaminated with 0.5% of anthraquinone, 2.0% of 1,6- and 1,7-dichloroanthraquinone, 2.5% of 1,5- and 1,8-dichloroanthraquinone and 2.0% of other compounds, are employed in the flask of the test installation (according to Example 1). At an absolute pressure at the top of 20 mm Hg and a reflux ratio R/T=4/1, highly pure 1-chloroanthraquinone (>99% pure) is obtained:
(A) first runnings at a top temperature of 260° C.; about 105 g,
(B) main fraction at a top temperature of 264° C.; 1,067 g of 99.5% pure 1-chloroanthraquinone and
(C) residue; about 228 g.
The sump temperature rises from 286° C. at about 40 mm Hg (start of the distillation) to about 300° C. (end of the distillation).

EXAMPLE 4 (see FIG. 1)

40 kg/hour of a 1,5-dichloroanthraquinone, produced from anthraquinone-1,5-disulphonic acid by exchanging the sulpho groups by chlorine according to Fischer (Ullmann's Encyclopädie der technischen Chemie (Ullmann's Encyclopaedia of Industrial Chemistry), 4th Edition, Volume 7, page 589) and of the following composition: about 1.5% by weight of 1-chloroanthraquinone, about 1.5% by weight of 1,8-dichloroanthraquinone, about 95.0% by weight of 1,5-dichloroanthraquinone, about 1.0% by weight of trichloroanthraquinone and about 1.0% by weight of insoluble matter, are melted at 270° C. in melting screw (1) and fed continuously via line (2) to thin layer evaporator (3). About 3.0 kg/hour of higher-boiling impurities and residues are concentrated in the sump of the thin layer evaporator and withdrawn via line (7) and receiver (8). The pre-purified product is fed via line (6), by-passing column (9), directly into column (15). Condenser (5) and line (6) are heated to 260° C. The thin layer evaporator is operated at a top pressure of 20 mm Hg, corresponding to a temperature of 290° C. The temperature of the heating agent is 340° C. In column (15) the more volatile impurities 1-chloroanthraquinone and 1,8-dichloroanthraquinone are concentrated at the top to about 30% and are withdrawn (about 3 kg/hour) via line (17). Condenser (16) and line (17) are heated with heat transfer oil at 220° C. The column is operated under a vacuum of 20 mm Hg and at a top temperature of about 280° C. using a reflux ratio R/T=120. 1,5-Dichloroanthraquinone, freed from low-boiling impurities, is withdrawn from the sump via line (18) and is freed, in thin layer evaporator (20), from higher-boiling impurities and cracked products. These leave the thin layer evaporator via line (23). The thin layer evaporator (20) and the evaporator (19) of column (15) are heated with heat transfer oil at 340° C. 32 kg/hour of a 99% pure 1,5-dichloroanthraquinone are obtained via distillate take-off (22) after condensation in condenser (21). Thin layer evaporator (20) operates at an absolute pressure of 20 mm Hg and at a boiling point of 290° C. Condenser (21) and take-off (22) are heated at 260° C., which is above the melting point.

EXAMPLE 5 (see FIG. 1)

1,8-Dichloroanthraquinone, produced from anthraquinone-1,8-disulphonic acid by exchanging the sulpho group by chlorine according to Fischer (Ullmann's Encyclopädie der technischen Chemie (Ullmann's Encyclopaedia of Industrial Chemistry), 4th Edition, Volume 7, page 589), BIOS, Final Report, 1484) and of the following composition: about 2% of 1-chloroanthraquinone, about 95% of 1,8-dichloroanthraquinone, about 1% of 1,5-dichloroanthraquinone, about 1% of trichloroanthraquinone and about 1% of insoluble matter, can be purified in a corresponding manner. 80 kg/hour are melted at 240° C. in melting screw (1) and fed continuously via line (2) to the thin layer evaporator (3). About 6 kg/hour of higher-boiling impurities and residues are concentrated in the sump of the thin layer evaporator and withdrawn via line (7) and receiver (8). The pre-purified distillate is fed via line (6) directly to column (15). Condenser (5) and distillate take-off (6) are heated to 220° C. The thin layer evaporator is operated at a top pressure of 20 mm Hg and a boiling point of 288° C. In column (15) the more volatile constituents are concentrated at the top to about 30% 1-chloranthraquinone and withdrawn (about 6 kg/hour) via line (17). Condenser (16) and distillate line (17) are heated with oil at 220° C. The column is operated at a top pressure of 20 mm Hg, a boiling point of 275° C. and a reflux ratio of 50/1. 1,8-Dichloroanthraquinone, freed from low-boiling impurities, is withdrawn from the sump via LINE (18) and freed, in thin layer evaporator (20), from further higher-boiling impurities and cracked products. Thin layer evaporator (20) and evaporator (19) of column (15) are heated with oil at 340° C. At 45 mm Hg, the boiling point in the sump of the column is 312° C. The impurities (about 6 kg/hour) separated off in thin layer evaporator (20) are withdrawn via line (23). 62 kg/hour of pure, 99% strength 1,8-dichloranthraquinone are withdrawn via distillate line (22) after condensation in condenser (21) at 220° C.

EXAMPLE 6 (see FIG. 1)

1,200 l of 10% strength sodium chlorate solution are added in the course of 4 hours to 150 kg of anthraquinone-2-sulphonic acid (Na salt), (produced according to Ullmann, Encyclopädie der technischen Chemie (Encyclopaedia of Industrial Chemistry), 4th Edition, Volume 7, page 589; Bios Final Report 1484) with 90 kg of potassium chloride in 2,745 l of water and 255 l of sulphuric acid (96%) at 100° C. in an enamelled 6 m³ kettle, while stirring (30–40 revolutions per minute) and the mixture is stirred for a further 5 hours at 100° C. The mixture is filtered at 80° C. through a filter press, the material on the filter is washed with hot water until the filtrate gives a neutral reaction and the filter cake is dried, 2-Chloroanthraquinone of the following composition: about 3% of anthraquinone, about 95% of 2-chloroanthraquinone, about 1% of 1-chloroanthraquinone and about 1% of insoluble matter is obtained.

For purification, 80 kg//hour are melted continuously at 240° C. using the melting screw (1) and fed via line (2) to the thin layer evaporator (3). 4 kg/hour of insoluble matter and higher-boiling impurities are withdrawn, in the concentrated form, via line (7) and receiver (8). The pre-purified distillate is fed via line (6) to column (9). The thin layer evaporator (20) is operated at 30 mm Hg, corresponding to a boiling point of 265° C. The thin layer evaporator is heated with heat transfer oil at 320° C. The condenser (5) and line (6) are heated to 220° C. In column (9), 1-chloranthraquinone is concentrated in the sump to about 15% and withdrawn (about 5 kg/hour) via line (12). 2-Chloroanthraquinone, together with anthraquinone, is fed via line (11) to the following column (15). Column (9) is operated at a top pressure of 30 mm Hg, corresponding to a boiling point of 266° C., and a reflux ratio of R/T=15/1. Condenser (10) and line (11) are heated to 220° C. At a pressure of 45 mm Hg, a boiling point of about 285° C. is set up in the sump of column (9). Evaporator (14) is heated at 340° C. In column (15) the lower-boiling impurity anthraquinone is concentrated to about 30% and withdrawn (about 8 kg/hour) via line (17). The column is operated at a top pressure of 30 mm Hg. A boiling point of about 260° C. is set up. Condenser (16) and line (17) are heated to 240° C. The reflux ratio is R/T=40. 2-Chloroanthraquinone, freed from anthraquinone, is withdrawn from the sump via line (18). At 55 mm Hg, a boiling point of 286° C. is set up in the sump of the column. The evaporator is heated with oil at 340° C. In thin layer evaporator (20), 2-chloroanthraquinone is freed from further higher-boiling impurities and cracked products. These are discharged via line (23). 59 kg/hour (pure 99% strength 2-chloroanthraquinone) are condensed at 220° C. in condenser (21) and withdrawn via line (22). The thin layer evaporator is heated with heat transfer oil at 340° C.

EXAMPLE 7 (see FIG. 2)

(a) 530 g/hour of a chloroanthraquinone mixture of the composition: 15% of 2-chloroanthraquinone, 13% of 1-chloroanthraquinone, 32% of 1,6- and 1,7-dichloroanthraquinone, 30% of 1,5- and 1,8-dichloroanthraquinone and 7% of 1,4,5-trichloroanthraquinone (produced by appropriate mixing together of the chloroanthraquinones obtained according to Example 1a/1b) are melted at 260° C. in a melting screw (101) and metered continuously via line (102) into a thin layer evaporator (103) (nominal width 50, wiped length 200 mm), which is heated with heat transfer oil at 300° C. The vapors produced in the thin layer evaporator rise into a concentrating column (104) (nominal width 50, 500 mm packing height, packing: 4×4 mm wire mesh rings), which is provided with adiabatic jacket heating, and are condensed completely in condenser (105) (boiling point at 20 mm Hg; about 275° C.). At a reflux/take-off ratio of =1/1, about 500 g/hour of top product are withdrawn as the distillate via line (106). Distillation receivers and the condenser are heated with heat transfer oil at 230° C. About 30 g/hour of a viscous residue flow from the sump of the thin layer evaporator via line (107) into the receiver (108), which is heated at 270° C., for the sump product.

(b) 500 g/hour of the distillate obtained in the prepurification stage are metered continuously in the liquid form via line (106) into a column (109) which has a stripping section and a rectification section. (Column: nominal width 50, stripping section: 2 m packing height, 4×4 wire mesh rings, rectification section: 1.5 m packing height, 4×4 wire mesh rings).

The structure of the column is essentially analogous to the arrangement described in Example 1. The only difference is that the sump is heated by means of a falling film evaporator(110). At a top pressure of 15 mm Hg and a top temperature of 245° C., condensation is effected in condenser(111) and, with a reflux ratio of 15/1, about 75 g/hour of a 97% pure 2-chloroanthraquinone, contaminated essentially with 1-chloranthraquinone, are obtained. (Condenser and take-offs(112)heated to about 220° C.). At a sump pressure of 30 mm Hg and a boiling point of 292° C., 425 g/hour of sump product with a 2-chloroanthraquinone content of <0.5% run via line (113) and filter (114) into the following column (115). Cracked products which are formed during the process are removed from the product by means of filter (114).

(c) About 425 g/hour of the sump product which has previously been produced are metered in the liquid form at 250° C. into the column (115), which in principle is the same as that in which 2-chloroanthraquinone has previously been obtained. However, instead of the packing height of 2 m previously required as the stripping section, a packing height of only 1 m is now required. At a top pressure of 20 mm Hg and a boiling point of 263° C., about 65 g/hour of 97% pure 1-chloroanthraquinone, contaminated with 2-chloroanthraquinone and isomeric 1,6- and 1,7-dichloroanthraquinone are obtained at a reflux ratio of 12/1. Condenser (116) and distillate take-off (117) are heated with heat transfer oil at about 180° C. The column is heated via evaporator (118). At 30 mm Hg and a sump temperature of 300° C., about 360 g/hour are withdrawn as the sump product via line (119) and are freed, in an intermediate purification stage (thin layer evaporator (120), from high-boiling products and products which cannot be distilled. The product, consisting essentially of the dichloroanthraquinone isomers with 0.5% of 1-chloroanthraquinone as the low-boiling impurity, is fed via line (121) to the following column (122).

(d) The sump product which has previously been obtained is now separated in a considerably longer column (122) (rectification section 2m, stripping section 3 m; column diameter 70 mm) into the mixtures of isomeric 1,6- and 1,7-dichloroanthraquinones and 1,5- and 1,8-dichloroanthraquinones. About 360 g/hour are metered at 260° C. to the column. At a top pressure of 10 mm Hg and a top temperature of 262° C. and with a reflux ratio of R/T=30/1, about 168 g/hour of a 93% pure mixture of isomeric 1,6- and 1,7-dichloroanthraquinone are obtained. (Condenser (123) and distillate take-off (124) are heated to about 220° C. and evaporator (125) is heated to 325° C.). At 32 mm Hg and a sump temperature of 308° C., about 192 g/hour of a mixture of isomeric 1.5- and 1,8-dichloroanthraquinone, contaminated with <1% of 1,6- and 1.7-dichloroanthraquinone as well as about 25% of trichloroanthraquinone and higher-boiling components, are fed, as the sump product, via line (126) (heated to 280° C.) and filter (127) to the following column (128).

(e) About 192 g/hour of the sump product previously obtained are now fed at 270° C. into a column (128) with a 1 m rectification section and a 2 m stripping section. At a top pressure of 10 mm Hg and a boiling point of 280° C. and with a reflux ratio of R/T = 4/1, about 149 g/hour of a 94% pure mixture of isomeric 1,5- and 1,8-dichloroanthraquinone are obtained. Condenser (129) and distillate take-off (130) are heated to 230° C. At a sump pressure of 22 mm Hg and a boiling point of 310° C. (evaporator (131) heated to 340° C.), a sump mixture (43 g/hour) is withdrawn which contains, in addition to dichloroanthraquinones and higher-boiling components, about 50% of 1,4,6- and 1,4,5-trichloroanthraquinone. The sump take-off (132) is heated to about 280° C.

Via thin layer evaporator (133) and concentrating column (134) it is possible to obtain from this product about 20 g/hour of distillate, which are condensed in condenser (135) at a top pressure of 10 mm Hg and a top temperature of 285° C. and are taken off via (136): high-boiling impurity and residues are withdrawn via line (137). The distillate consists to the extent of 92% of trichloroanthraquinone isomers and is contaminated to the extent of about 8% by isomeric 1,5- and 1,8-dichloroanthraquinone.

When a mixture of dichloroanathraquinone isomers which is free from monochloroanthraquinone is employed, the crude product which is pre-purified in thin layer evaporator (103) is fed direct, by-passing column (109) and (115), via line (138) to column (122). It is possible, for example, to use the mixture indicated in Example 8a as the feed product.

EXAMPLE 8

(a) A mixture consisting of 1,400 g of dichloroanthraquinones (56% of 1,6 and 1.7 isomers and 44% of 1,5 and 1,8 isomers; obtained by distillation according to Example 1) and 600 g of a dinitroanthraquinone mixture such as is obtained, for example, as the residue from dinitration of anthraquinone (compare Example 8c), is melted, while passing in nitrogen and supplying heat (heating by circulation through a thermostat), in a twin-wall glass reaction vessel (length: 450 mm; internal diameter: 80 mm), which is preheated to 240° C. annd has a base frit (porosity=D2). Chlorine (48 l/hour) is passed into this melt until no further nitrous gases evolve and no dinitroanthraquinones can be detected by thin layer chromatography (about 80 minutes).

The reaction melt is poured onto an enamel sheet and is comminuted after solification. A dichloranthraquinone mixture consisting of 56% of 1,6- and 1,7-isomers and 44% of 1,5- and 1,8-isomers is obtained.

1,000 g of this mixture are employed in the flask of the test apparatus, which is as described in Example 1 but in which the packing height is lengthened by 1 m, and rectified under a vacuum at the top of 5 mm Hg using a reflux ratio of 30/1. The products which follow can be obtained.

1st main fraction at a top temperature of 245° C.=452 g of a 94% pure mixture of 1,6- and 1,7-dichloroanthraquinone, 1st intermediate fraction — 210 g comprising 48% of a mixture of 1,6- and 1,7-dichloroanthraquinone and a 52% pure mixture of 1,5- and 1,8-dichloroanthraquinone and 2nd main fraction=198 g of a 92% pure mixture of 1,5- and 1,8-dichloroanthraquinone (residue: 140 g).

The intermediate fraction can be employed again and be distilled. The temperature in the flask rises from 290° C. initially to 315° C. at the end of the distillation (at about 25 mm Hg).

(c) The dinitroanthraquinone mixture employed in Example 8a can be produced, for example, as follows:

300 g of 99% pure anthraquinone are introduced at 40° C. into 1.2 of 98% strength $HNO_3$. The mixture is stirred for a further 3 hours at 40 to 42° C. and for 1 hour at 65° to 70° C. The reaction product is filtered off. Filter cake I and filtrate I are obtained.

Filter cake I is stirred with 300 ml of $HNO_3$ (98% strength) for 1 hour at 65 to 70° C., the mixture is stirred for 2 hours in the cold and filtered and the material on the filter is washed with $HNO_3$ (98% strength). A moist filter cake and an extract are obtained. After washing until neutral and drying, the filter cake gives 129.4 g of 1,5-dinitroanthraquinone. $HNO_3$ is distilled off from filtrate I at 60 to 70° C., until 75% by weight of residue remain. The residue is stirred for a further 2 hours and filtered and the material on the filter is washed with 80% strength $HNO_3$. Filter cake II and filtrate II are obtained. After washing until neutral and drying, filter cake II gives 65 g of 1,8-dinitroanthraquinone.

Filtrate II is combined with the extract obtained above and nitric acid is distilled off until 65% by weight of residue remain; the residue is stirred for 2 hours in the cold and filtered and the material on the filter is washed with HNO₃ (80% strength). Filter cake III and filtrate III are obtained.

Filter cake III consists of 1,5- and 1,8-dinitroanthraquinone. Filtrate III is evaporated to dryness at 60° C. in a partial vacuum. 136.2 g of a dinitroanthraquinone mixture, which contains, as the main component, 1,5-, 1,6-, 1,7- and 1,8-dinitroanthraquinone, remain.

It will be appreciated that the instant specification and examples are set forth by way of illustration and not limitation, and that various modifications and changes may be made without departing from the spirit and scope of the present invention.

What is claimed is:

1. A process for concentrating a feed comprising essentially mono-, di- or tri-halogenated anthraquinones or mixtures thereof which comprises subjecting said feed containing at least two of said mono-, di- or tri-halogenated anthraquinones or mixture thereof to fractional vacuum distillation in a heated rectification column or a cascade of columns having an efficiency corresponding to about 20 to 50 theoretical stages with an absolute pressure at the top of about 0.5 to 50 mm Hg and a reflux to take-off ratio of about 5/1 to 50/1 to provide a concentrated halogenoanthraquinone fraction and withdrawing overhead as distillate the concentrated halogenoanthraquinone fraction.

2. The process according to claim 1, wherein the column is adiabatically heated.

3. The process according to claim 1, wherein the halogenoanthraquinones are chloroanthraquinones.

4. The process according to claim 1, wherein the feed containing at least two halogenoanthraquinones comprises the product obtained by the action of chlorine on a melt, suspension or solution in a chlorine-resistant organic solvent of a mixture of nitroanthraquinones isolated from a mother liquor obtained from the industrial mono- or di-nitration of anthraquinone.

5. The process according to claim 4, wherein the feed containing at least two halogenoanthraquinones comprises the product obtained by the action of chlorine at about 180 to 300° C. on a mass comprising nitroanthraquinone and at least about 10% by weight of at least one chloro-anthraquinone as diluent.

6. The process according to claim 5, wherein the nitroanthraquinone is obtained as the sump product from an industrial mono- or di-nitration of anthraquinone.

7. The process according to claim 1, wherein the feed containing at least two halogenoanthraquinones comprises at least two of 1-dichloroanthraquinone, 2-chloroanthraquinone, 1,5-dichloroanthraquinone and 1,8-dichloroanthraquinone.

8. The process according to claim 1, wherein the feed containing at least two halogenonanthraquinones is obtained by the action of chlorine on a melt of industrial grade 1-nitroanthraquinone.

9. The process according to claim 1, wherein the feed containing at least two halogenoanthraquinones comprises a major amount of 1-chloroanthraquinone and is distilled at a temperature about 80 to 100° C. above the melting point of the mixture.

10. The process according to claim 1, wherein the distillation is carried out by a continuous flow, sump to overhead, in a cascade of colums, the products withdrawn from the top of the first column being 2-chloroanthraquinone, 1-chloroanthraquinone in the third column and 1,5- and 1,8-dichloroanthraquinone in the fourth column, 1,4,5- and 1,4,6-trichloroanthraquinone being obtained in the sump of the fourth column and being separated from the sump of the fourth column by film evaporation.

11. The process according to claim 1, wherein the feed containing at least two halogenoanthraquinones comprises 1,5- and 1,8-dichloranthraquinone whereby a concentrated binary mixture thereof is obtained as the said distillate.

12. The process according to claim 11, wherein the binary mixture of 1,5- and 1,8-dichloroanthraquinone is concentrated to about 92 to 95% purity by a further vacuum rectification with a short residence time.

13. The process according to claim 1, wherein the feed containing at least two halogenoanthraquinones comprises a technical grade chloroanthraquinone containing impurities which cannot be distilled or which cannot be condensed, said impurities being removed prior to subjecting said technical grade chloroanthraquinone to fractional vacuum distillation.

14. The process according to claim 10, wherein the particular sump products of at least one of the columns are subjected to preliminary purification, in order to remove cracked products, before the sump product is forwarded to and fractionated in the next successive column of the cascade.

15. The process according to claim 1, wherein feeds resulting from the action of elementary chlorine or bromine on industrial grade mono- or dinitration products of anthraquinone are used for the fractional vacuum distillation.

16. A process of claim 1, wherein the feed contains monohalogenoanthraquinones and the concentrated halogenoanthraquinone fraction comprises essentially a monohalogenoanthraquinone.

17. A process of claim 16, wherein the feed contains 1-monohalogenoanthraquinone and the concentrated 1-monohalogenoanthraquinone fraction comprises essentially 1-halogenoanthraquinone.

18. A process of claim 1, wherein the feed contains a mixture of dihalogenated anthraquinones and the concentrated dihalogenoanthraquinone fraction comprises essentially a binary mixture of dihalogenoanthraquinones.

19. A process of claim 18, wherein the feed contains 1,5-dihalogenoanthraquinone and the concentrated dihalogenoanthraquinone fraction comprises essentially 1,5-dihalogenoanthraquinone.

20. A process of claim 18, wherein the feed contains 1,8-dihalogenoanthraquinone and the concentrated dihalogenoanthraquinone fraction comprises essentially 1,8-dihalogenoanthraquinone.

* * * * *

UNITED STATES PATENT AND TRADEMARK OFFICE
CERTIFICATE OF CORRECTION

PATENT NO. : 4,162,946
DATED : July 31, 1979
INVENTOR(S) : Bernd thelen, et al.

It is certified that error appears in the above-identified patent and that said Letters Patent are hereby corrected as shown below:

Column 15, line 52, "1-dichloro" should be --1-chloro- --.

Column 16, line 7, before "in the" insert --in the second column, 1,6- and 1,7-dichloroanthraquinone --.

Signed and Sealed this

Thirteenth Day of November 1979

[SEAL]

Attest:

RUTH C. MASON
Attesting Officer

LUTRELLE F. PARKER
Acting Commissioner of Patents and Trademarks